United States Patent
Weilert et al.

(10) Patent No.: US 12,502,030 B2
(45) Date of Patent: Dec. 23, 2025

(54) OVEN ACCESSORY FOR A FIRE PIT

(71) Applicant: SOLO BRANDS, LLC, Grapevine, TX (US)

(72) Inventors: Jeffrey R. Weilert, Southlake, TX (US); Alexander K. Maghsadi, Lewisville, TX (US)

(73) Assignee: Solo Brands, LLC, Grapevine, TX (US)

( * ) Notice: Subject to any disclaimer, the term of this patent is extended or adjusted under 35 U.S.C. 154(b) by 578 days.

(21) Appl. No.: 17/941,911

(22) Filed: Sep. 9, 2022

(65) Prior Publication Data

US 2024/0081580 A1 Mar. 14, 2024

(51) Int. Cl.
*A47J 37/06* (2006.01)
*A47J 33/00* (2006.01)
*F24B 1/00* (2006.01)

(52) U.S. Cl.
CPC ........... *A47J 37/0658* (2013.01); *A47J 33/00* (2013.01); *F24B 1/003* (2013.01)

(58) Field of Classification Search
CPC ........ A47J 37/0658; A47J 33/00; F24B 1/003
See application file for complete search history.

(56) References Cited

U.S. PATENT DOCUMENTS

| | | |
|---|---|---|
| 634,959 A | 10/1899 | Gustave |
| 1,895,230 A | 1/1933 | Needham |
| 2,760,672 A * | 8/1956 | Cronheim ............. A47J 36/064 220/369 |
| 2,898,437 A | 8/1959 | Mcfarland |
| 3,425,364 A | 2/1969 | Martin, Jr. |
| 4,506,652 A | 3/1985 | Baker |
| 4,538,050 A | 8/1985 | Willett |
| 5,119,719 A | 6/1992 | Depasquale |
| 5,205,274 A | 4/1993 | Smith |
| 5,378,872 A | 1/1995 | Jovanovic |
| 5,492,055 A | 2/1996 | Nevin |
| 5,539,184 A | 7/1996 | Su |
| 6,119,584 A | 9/2000 | Hsu |
| 6,244,163 B1 | 6/2001 | Lee |
| 6,250,210 B1 | 6/2001 | Moreth |
| 6,257,128 B1 | 7/2001 | Chen |
| 6,265,697 B1 | 7/2001 | Sen |
| 6,418,835 B1 | 7/2002 | Lin |
| 6,437,291 B1 | 8/2002 | Hopponen |
| 6,450,087 B2 | 9/2002 | Backus |
| 6,745,758 B1 | 6/2004 | Minidis |

(Continued)

FOREIGN PATENT DOCUMENTS

| | | |
|---|---|---|
| CN | 110505824 A | 11/2019 |
| CN | 114504254 A | 5/2022 |

(Continued)

*Primary Examiner* — Alfred Basichas
(74) *Attorney, Agent, or Firm* — Haynes and Boone, LLP

(57) ABSTRACT

A cooking system includes a fire pit having a burn chamber and includes an oven disposed above the burn chamber of the fire pit. The oven may include an open bottom forming a heatable chamber spaced from the burn chamber of the fire pit, with the heatable chamber configured to receive heat from the fire pit. A cooking surface is disposed in the heatable chamber, and an enclosed top is configured to retain the heat. The enclosed top and the cooking surface form a cooking chamber.

36 Claims, 9 Drawing Sheets

(56) References Cited

U.S. PATENT DOCUMENTS

| | | |
|---|---|---|
| 6,802,247 B1 | 10/2004 | Lee |
| 6,809,297 B2 | 10/2004 | Moon |
| 7,021,204 B2 | 4/2006 | Backus |
| 7,138,609 B2 | 11/2006 | Popeil |
| 7,173,217 B2 | 2/2007 | De Longhi |
| 7,325,484 B1 | 2/2008 | Backus |
| 7,655,884 B2 | 2/2010 | Engelhardt |
| 7,686,010 B2 | 3/2010 | Gustavsen |
| 7,739,948 B2 | 6/2010 | Backus |
| 7,823,577 B1 | 11/2010 | Babjak |
| 8,578,927 B2 | 11/2013 | Gustavsen |
| 9,182,129 B2 | 11/2015 | Dahle |
| 9,198,436 B2 | 12/2015 | Cook |
| 9,532,679 B1 * | 1/2017 | Besch ............... A47J 33/00 |
| 9,795,147 B2 | 10/2017 | Hegarty |
| 9,848,731 B2 | 12/2017 | Dahle |
| 9,995,492 B2 | 6/2018 | Froelicher |
| 10,012,392 B2 | 7/2018 | Froelicher |
| 10,105,008 B2 | 10/2018 | Contarino, Jr. |
| 10,413,123 B2 | 9/2019 | Dahle |
| 10,420,347 B2 | 9/2019 | Hegarty |
| 10,477,867 B2 | 11/2019 | Froelicher |
| 10,524,616 B2 | 1/2020 | Contarino, Jr. |
| 10,575,680 B2 | 3/2020 | Fagg |
| 10,624,353 B1 | 4/2020 | Langley |
| 10,788,266 B2 | 9/2020 | Tseng |
| 10,823,425 B2 | 11/2020 | Tseng |
| 10,823,426 B2 | 11/2020 | Tseng |
| 10,842,315 B1 | 11/2020 | Swinney |
| 10,912,307 B2 | 2/2021 | Moretti |
| 10,920,988 B2 | 2/2021 | Tseng |
| 10,920,989 B2 | 2/2021 | Tseng |
| 10,941,945 B2 | 3/2021 | Tapaninaho |
| 10,973,369 B2 | 4/2021 | Zhang |
| 11,076,718 B2 | 8/2021 | Borovicka |
| 11,224,228 B1 | 1/2022 | Langley |
| 11,399,658 B2 | 8/2022 | Tapaninaho |
| 11,464,233 B2 | 10/2022 | Gozney |
| 11,464,234 B2 | 10/2022 | Hegarty |
| 2004/0247762 A1 | 12/2004 | Xu |
| 2007/0114220 A1 | 5/2007 | De Longhi |
| 2008/0135037 A1 | 6/2008 | Hards |
| 2008/0277541 A1 * | 11/2008 | Stephens ............ E04H 15/003 |
| | | 248/188.6 |
| 2009/0000493 A1 | 1/2009 | Mosher, II |
| 2013/0068112 A1 | 3/2013 | Ho |
| 2014/0196609 A1 | 7/2014 | Snyman |
| 2014/0216434 A1 | 8/2014 | Moreth, III |
| 2016/0324165 A1 | 11/2016 | Li |
| 2018/0213973 A1 | 8/2018 | Tapaninaho |
| 2018/0228169 A1 | 8/2018 | Froelicher |
| 2019/0101324 A1 | 4/2019 | Cubeiro Martinez |
| 2019/0142215 A1 | 5/2019 | Popeil |
| 2019/0170365 A1 | 6/2019 | Choi |
| 2019/0195506 A1 | 6/2019 | Tseng |
| 2019/0246835 A1 | 8/2019 | Tsai |
| 2020/0077839 A1 | 3/2020 | Dahle |
| 2020/0345176 A1 | 11/2020 | Bert |
| 2021/0076874 A1 | 3/2021 | Tapaninaho |
| 2021/0161151 A1 | 6/2021 | Thorogood |
| 2021/0361114 A1 | 11/2021 | Gozney |
| 2021/0369051 A1 | 12/2021 | Thorogood |
| 2022/0061588 A1 | 3/2022 | Yan |
| 2022/0142404 A1 | 5/2022 | Conrad |
| 2022/0192421 A1 | 6/2022 | Bert |
| 2022/0240716 A1 | 8/2022 | Costa Marques |
| 2022/0304505 A1 | 9/2022 | Tapaninaho |
| 2022/0322877 A1 | 10/2022 | Greer |
| 2024/0237163 A1 * | 7/2024 | Cho ............... H05B 6/6476 |

FOREIGN PATENT DOCUMENTS

| | | |
|---|---|---|
| CN | 216534992 U | 5/2022 |
| CN | 216776757 U | 6/2022 |
| CN | 216876048 U | 7/2022 |
| CN | 217161842 U | 8/2022 |
| CN | 217338293 U | 9/2022 |
| CN | 217447451 U | 9/2022 |
| CN | 217524738 U | 10/2022 |
| CN | 217609218 U | 10/2022 |
| CN | 217610598 U | 10/2022 |
| CN | 217610635 U | 10/2022 |
| CN | 217696131 U | 11/2022 |
| CN | 217772091 U | 11/2022 |
| DE | 202004006450 U1 | 8/2004 |
| EP | 3735879 B1 | 11/2020 |
| EP | 4014807 A1 | 6/2022 |
| FR | 2579869 A1 | 10/1986 |
| FR | 2732558 A1 | 10/1996 |
| GB | 2263764 B | 8/1993 |
| GB | 2545929 B | 7/2017 |
| GB | 2559161 A | 8/2018 |
| GB | 2571785 A | 9/2019 |
| GB | 2572380 A | 10/2019 |
| GB | 2572697 A | 10/2019 |
| GB | 2592290 A | 8/2021 |
| GB | 2593439 A | 9/2021 |
| GB | 2593440 A | 9/2021 |
| GB | 2597628 A | 2/2022 |
| GB | 2602928 A | 7/2022 |
| WO | 9955210 A1 | 11/1999 |
| WO | 2019193370 A1 | 10/2019 |
| WO | 2021165198 A1 | 8/2021 |
| WO | 2021165200 A1 | 8/2021 |
| WO | 2021165261 A1 | 8/2021 |
| WO | 2021165706 A2 | 8/2021 |

* cited by examiner

OVEN ACCESSORY FOR A FIRE PIT

TECHNICAL FIELD

The present disclosure relates generally to the field of food preparation. In particular, the present disclosure relates to a cooking oven accessory configured to be placed over a fire pit and receive and redirect heated air to uniformly heat a cooking surface.

BACKGROUND

Traditional pizza ovens are made of brick or stone and a wood fire is used to heat the interior. Depending on the type of food to be cooked, the oven may be designed to heat the cooking surface and surrounding internal temperature to extremely high temperatures. As a result, traditional pizza ovens are bulky, expensive, and usually permanent fixtures (i.e., not portable). For most casual pizza maker, acquiring a traditional pizza oven is expensive and labor intensive. In addition, owning a traditional pizza oven is also impractical, as it occupies a large amount of outdoor space, requires specialized skills for operation, and is likely used infrequently when compared with professional use.

In recent years, smaller pizza ovens have provided more practical alternatives to the traditional pizza oven for casual makers. These alternative ovens are typically constructed of metal and are smaller and more portable. However, these alternatives still typically occupy a dedicated space on an owner's property, such as on a counter or table space of an outdoor patio. As a result, this space is dedicated to essentially one purpose: cooking pizza or other similar food items, an infrequent activity.

In addition, alternative pizza ovens today use a variety of fuels for sources of heat, including propane and wood pellets. These fuels are specialized and must be regularly sourced. These specialized fuel sources limit portability and flexibility of use.

Alternative pizza ovens today also typically heat the cooking surface and interior of the oven with a heat source positioned at one side of the cooking surface. This asymmetrical positioning of the heat source relative to the cooking surface may result in uneven cooking of food in the oven and a user may need to regularly reposition the food to achieve semi-consistent heating.

SUMMARY

In some example aspects, the present disclosure is directed to a cooking system for cooking over a fire including a cooking surface disposed to support food items, and a first heat deflector having a side wall disposed at a side of the cooking surface, and a top wall above the cooking surface. The cooking surface and the top wall may define a cooking chamber, with the top wall being angled with respect to the cooking surface such that the top wall includes an upper portion adjacent the side wall and a lower portion extending over the cooking surface. The first heat deflector may also include a first plurality of holes disposed at the lower portion of the top wall.

In some aspects, the top wall forms an inverted dome. In some aspects, the inverted dome is an inverted frustoconical cone. In some aspects, the cooking system includes a second heat deflector below the cooking surface configured to direct heat toward an outer perimeter of the cooking surface. In some aspects, the second heat deflector and cooking surface form a baffle. In some aspects, the side wall is a curved wall extending around a perimeter of the cooking surface. In some aspects, the side wall includes an opening configured to provide access to the cooking surface. In some aspects, the cooking system may include a door hingedly coupled to a side of the opening and configured to allow selective access to the cooking surface. In some aspects, the side wall extends below the cooking surface. In some aspects, the cooking system may include an outer wall above the top wall, the outer wall including a second plurality of holes. In some aspects, the outer wall and the top wall form a baffle. In some aspects, a number of the second plurality of holes corresponds to a number of the first plurality of holes and the second plurality of holes are vertically aligned with the first plurality of holes. In some aspects, the cooking system may include one or more legs configured to space the cooking surface above a heat source. In some aspects, the one or more legs include alignment features configured to centrally align the cooking system over a fire pit. In some aspects, the cooking surface is solid.

In some examples, the present disclosure is directed to a cooking system for cooking over a fire that includes a cooking surface and a heat deflector. The heat deflector may include a side wall disposed at a side of the cooking surface and an inverted dome above the cooking surface. The inverted dome may be angled with respect to the cooking surface such that the inverted dome includes an upper portion and a lower portion, the lower portion aligned with a central region of the cooking surface.

In some aspects, the lower portion of the inverted dome includes a plurality of holes. In some aspects, the inverted dome is centrally aligned with the cooking surface. In some aspects, a width of the inverted dome is greater than a width of the cooking surface. In some aspects, an outer perimeter of the inverted dome includes a surface angled opposite the angle of the inverted dome.

In some examples, the present disclosure is directed to a cooking system for cooking over a fire and includes a cooking surface disposed to support food items and one or more upwardly extending side walls on opposing sides of the cooking surface. The side walls may extend from below the cooking surface to above the cooking surface and may be spaced from the cooking surface to form a convective gap at opposing sides of the cooking surface. The cooking system may also include a reflective ceiling extending over the cooking surface.

In some aspects, the upwardly extending side walls define an open bottom of the cooking system. T cooking system may further include a conical bottom heat guide beneath and centrally aligned with the cooking surface. In some aspects, the conical bottom heat guide is positioned between the upwardly extending side walls and vertically above a bottom edge of the upwardly extending side walls. In some aspects, the cooking system may include a flame guard positioned about a portion of a perimeter of the cooking surface. The flame guard may include a vertical wall extending upward from the portion of the perimeter of the cooking surface. In some aspects, the flame guard includes a plurality of holes. In some aspects, the flame guard is positioned about at least 25% of the perimeter of the cooking surface.

In some examples, the present disclosure is directed to a cooking system for cooking over a fire. The cooking system may include a cooking surface disposed to support food items and may include a heat deflector coupled to the cooking surface. The heat deflector may be positioned above the cooking surface and angled with respect to the cooking surface, the cooking surface and the heat deflector defining a cooking chamber. The cooking surface and the heat deflector may be configured to be positioned over a fire pit.

In some examples, the present disclosure is directed to an oven configured to be positioned above a heat source. The oven may include a heat deflector including a curved side wall and a top wall forming a chamber with an open bottom configured to receive heated air from the heat source. The oven may also include a cooking surface positioned within the chamber such that the heated air flows around the cooking surface. The top wall of the heat deflector may include a frustoconical protrusion positioned above, and centrally aligned with, the cooking surface and a plurality of holes at a central region of the protrusion, such that the heated air is directed by the protrusion radially inward and downward before passing through the plurality of holes.

In some aspects, the cooking surface include a perimeter and the heated air flows upward and around all sides of the perimeter of the cooking surface.

In some examples, the present disclosure is directed to a cooking system for cooking over a fire. The cooking system may include a cooking surface disposed to support food items and having a first width. A main body may be disposed about the cooking surface. The main body may have an enclosed top and an open bottom creating a heatable chamber. The open bottom may have a second width equal to or greater than the first width, and the cooking surface may be disposed in the heatable chamber.

In some aspects, the main body comprises a side opening configured to provide access to a cooking chamber defined by the cooking surface and the enclosed top.

In some examples, the present disclosure is directed to a cooking system that includes a fire pit having a burn chamber and an oven disposed above the burn chamber of the fire pit. The oven may have an open bottom forming a heatable chamber spaced from the burn chamber of the fire pit, the heatable chamber configured to receive heat from the fire pit. A cooking surface may be disposed in the heatable chamber. An enclosed top may be configured to retain the heat. The enclosed top and the cooking surface forming a cooking chamber.

In some aspects, the cooking system may include a leg extending from the cooking system to the fire pit, the leg supporting the cooking system above the burn chamber.

In some aspects, the leg is shaped and configured to rest on an upward facing surface of the fire pit.

In some aspects, the burn chamber has a burn chamber width and the open bottom has an open bottom width at least as large as 80% of the burn chamber width.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any implementation or aspect may be combinable with one or more features of other implementation or aspect.

BRIEF DESCRIPTION OF THE DRAWINGS

The accompanying drawings illustrate implementations of the systems, devices, and methods disclosed herein and together with the description, serve to explain the principles of the present disclosure.

Figure 1:
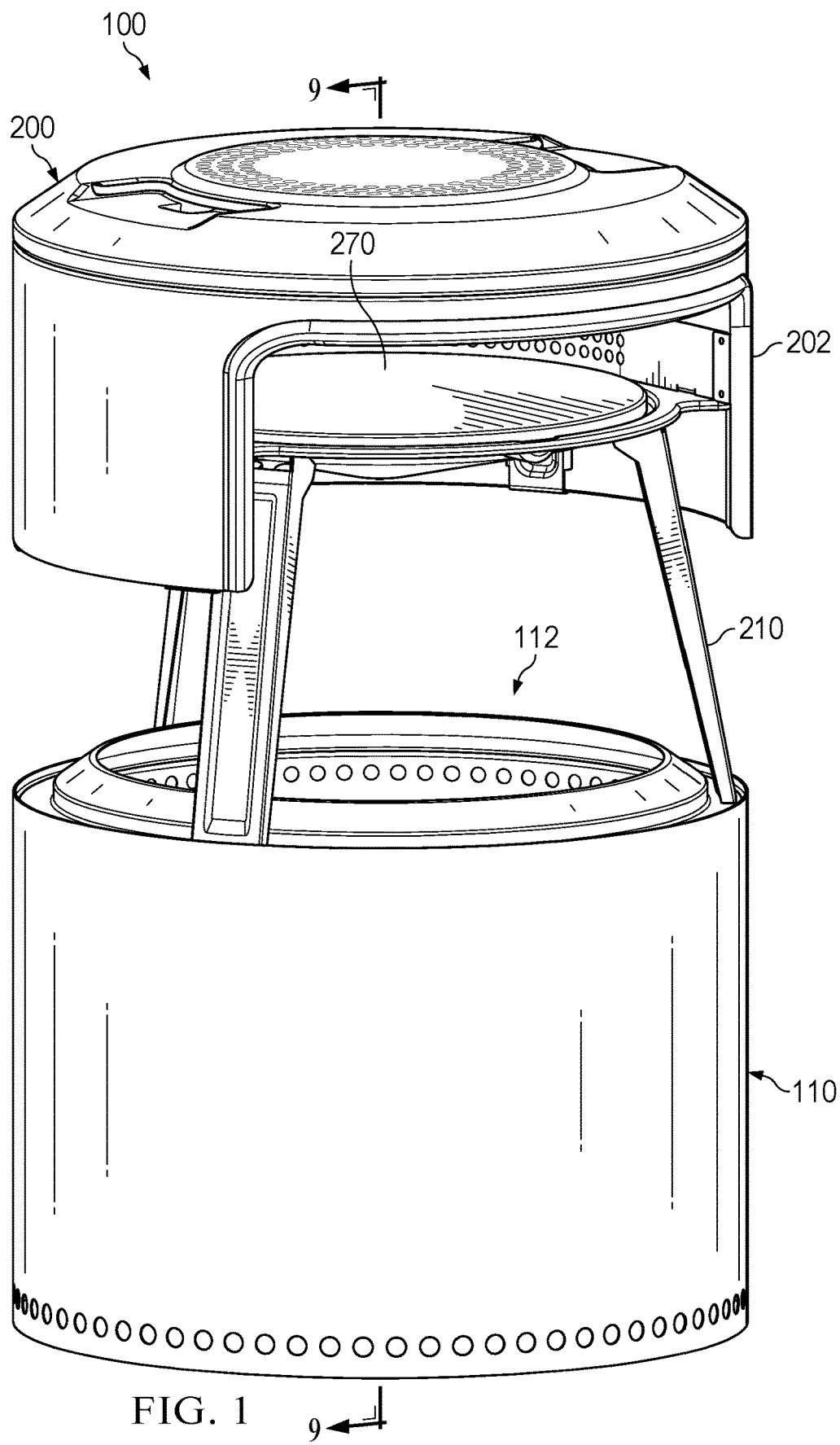
FIG. 1 is a perspective view of an oven on a fire pit, according to aspects of the present disclosure.

These Figures will be better understood by reference to the following Detailed Description.

DETAILED DESCRIPTION

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

Some aspects of the disclosure teach an oven as an accessory to be placed over a fire pit. The oven includes a housing with an interior formed by a top wall and side walls. The housing includes an open bottom. When the oven is placed on a fire pit, heated air from the fire pit rises through the open bottom to heat the interior of the housing. A cooking surface is disposed within the interior of the housing. Gaps between the outer perimeter of the cooking surface and the interior of the side walls of the oven allow heated air to heat the cooking surface from all sides. In some examples, the oven includes a flame guard around the cooking surface extending vertically upward. The flame guard may shield a portion or all of the outer perimeter of the cooking surface from direct heat so the outer perimeter of the cooking surface is not heated more quickly than the inner region of the cooking surface. In some examples, the top wall is shaped as an inverted dome and includes heat-relief or ventilation holes at a central region. The ventilation holes at the central region may draw heated air from the outer perimeter of the oven chamber (e.g., near the gaps around the perimeter of the cooking surface) toward the center of the oven chamber. In some examples, the inverted dome shape of the top wall may be angled downward toward the center of the oven chamber, and draws the heated air downward as the heated air moves toward the center of the oven chamber. In this way, the central ventilation holes and the inverted dome shape of the top wall may bring heated air toward the center of the cooking surface, thereby accelerating heating of the center of the cooking surface. By limiting heat at the perimeter edge of the cooking surface while drawing heat toward the center of the cooking surface, the cooking surface may be heated relatively uniformly, reducing the need for frequent repositioning of food during a cooking process.

The oven described herein provides multiple benefits. Because the oven is an accessory to a fire pit, the oven does not require dedicated space for the single functionality of pizza preparation. Rather, the oven occupies the same space as the fire pit. Users can, as a result, use the fire pit as a typical fire pit when desired as well as use the same space for pizza or other food cooking with the addition of the oven disclosed. In addition, the oven disclosed may provide more uniform heating than conventional ovens as described above. This is achieved because the heat source of the oven may provide heat at all sides of the cooking surface, as opposed to just one side. That is, the oven is directly above the heat source. In addition, the flame guard and top wall shaped as an inverted dome with holes may help facilitate uniform heating of the cooking surface. The oven disclosed can be used with a variety of heat sources, including easily attainable fuels. For example, a conventional fire may be used within the fire pit to provide heat for the oven. Other heat sources are also contemplated and may be used. This flexibility increases the practicality of using the oven in a wide variety of locations, including remote locations without access to specialized fuels. In addition, cooking pizza or other foods by a traditional wood fire, like traditional ovens, may be preferred by some users.

FIG. 1 is a perspective view of cooking system 100. The cooking system 100 includes an oven 200 on a fire pit 110, according to aspects of the present disclosure. As shown in FIG. 1, the oven 200 may be placed on a top surface of the fire pit 110 so as to be directly over the fire pit 110. As will be explained in more detail hereafter, a heat source may be placed within the interior cavity 112 of the fire pit 110. This heat source may be any suitable heat source. In some aspects, the heat source may be a fire.

In the example shown, the oven 200 includes a main body 202 and legs 210. The main body 202 forms the cooking portion of the oven, while the legs 210 provide a standoff separating the main body 202 from the fire pit 110. The oven 200 may include any suitable number of legs 210, including three as shown, or any number more or less than three. As shown in FIG. 1, the legs 210 may space the main body 202 of the oven 200 from the fire pit 110, such that a bottom most surface or component of the oven 200 is spaced from and does not contact the fire pit 110. Aspects of how heat may flow from the fire pit 110 upward and into the oven 200 will be described in more detail with reference to FIG. 6 hereafter.

Figure 2:
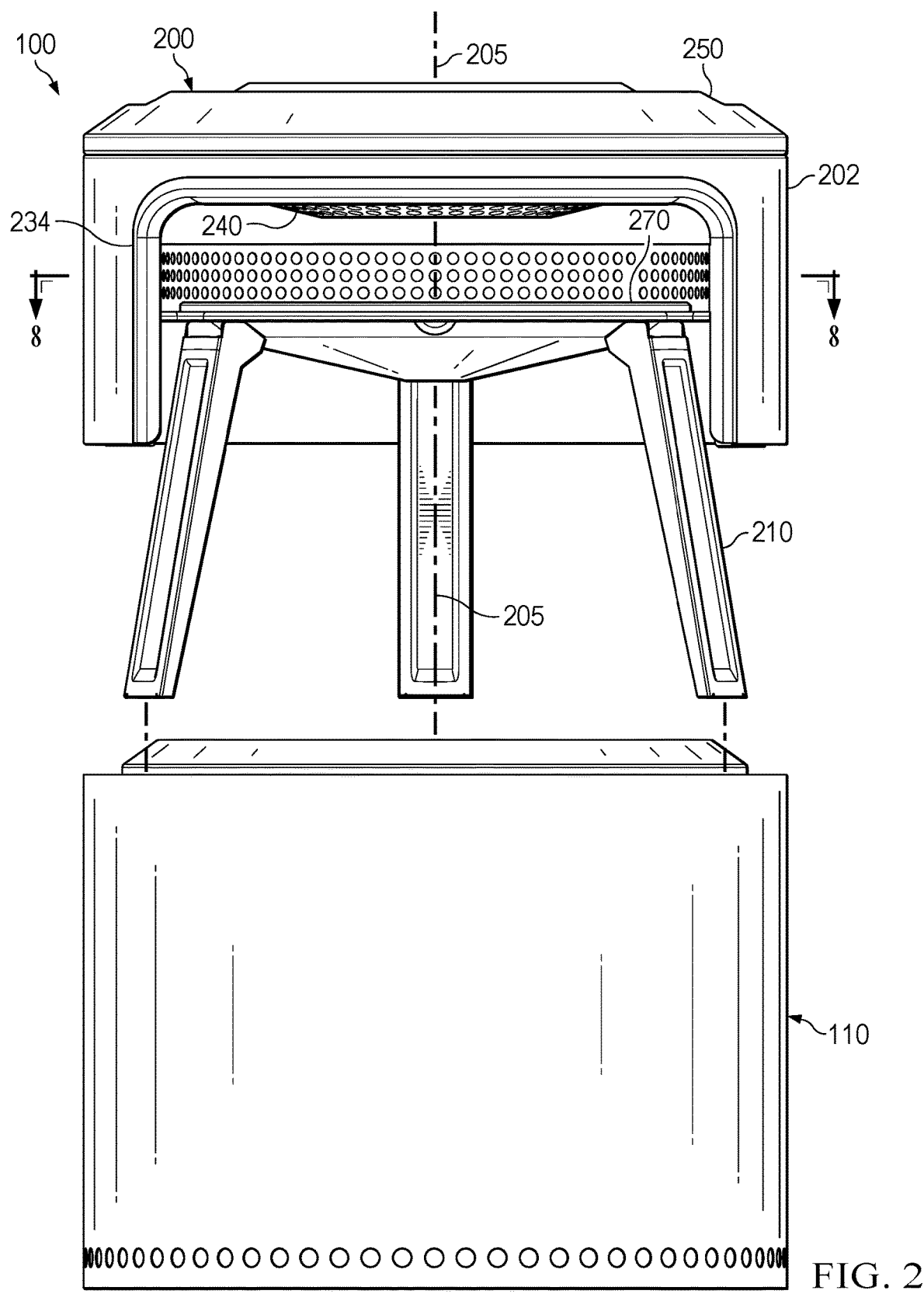
FIG. 2 is a front view of an oven and a fire pit, according to aspects of the present disclosure.

FIG. 2 is a front view of cooking system 100 with the oven 200 displaced from and disposed above the fire pit 110. Accordingly, the oven 200 may be a removable accessory for the fire pit 110. For example, a user may create a fire within the fire pit 110 and the oven 200 may optionally be positioned above and onto the fire pit 110, when desired for cooking.

As shown in FIG. 2, the main body 202 of the oven 200 may include an access opening 234. The access opening 234 may be located at side walls of the oven 200 at a forward-facing region and may provide access to the interior or cooking chamber 236 of the oven 200. The access opening 234 may be of any suitable shape. In the example shown in FIG. 2, the access opening 234 is formed in the side wall and may include an open bottom. In that regard, the access opening 234 in the example shown may include three edges: a top edge and two side edges. In use, a user may introduce or remove food into or out of the cooking chamber 236 of the oven 200 through the access opening 234. In some aspects, due to its shape and formation in the cylindrical main body 202, the access opening 234 may be referred to as a panoramic opening. For example, a panoramic opening may include an opening within a curved surface, such as a side wall of the main body 202.

In some aspects, the oven 200 may include a heat retention structure (not shown) such as a door, configured to provide selective access to the cooking chamber 236 of the oven 200 through the access opening 234. For example, the door may be positioned within the access opening 234. In some examples, the door may be hinged or rotatably coupled to one of the edges of the access opening 234. In some aspects, the door may prevent heat transfer through the access opening 234 when the door is in a closed position. In some aspects, the door may allow access to the cooking chamber 236 in the interior of the oven 200 when in an open position. Instead of being pivotably coupled to the door, the door may provide selective access to the cooking chamber 236 of the oven 200 in any other ways. For example, the door may be slidably coupled to the oven 200, e.g., by one or more tracks. In some implementations, the door may be collapsible and/or expandable, or provide selective access in any other way. Depending on the implementation, the door may be constructed of the same material as the walls of the oven 200 or may be constructed of a different material. In some aspects, the door of the oven 200 may be constructed of a transparent or semi-transparent material allowing a user of the oven 200 to view food within the oven 200 during cooking.

As shown in FIG. 2, the oven 200 may be centrally aligned with the fire pit 110. For example, a central longitudinal axis of the oven 200 may be aligned with a central longitudinal axis of the fire pit 110, as shown by the axis 205. In some aspects, the legs 210 of the oven 200 may be sized and shaped such that when the bottom-most surface of the legs 210 are positioned on the upper surface of the fire pit 110, a cooking plate 270 of the oven 200 is centrally aligned with the fire pit 110. This central alignment may facilitate even heating of the cooking surface of the oven 200 and/or food positioned on the cooking surface for cooking.

Figure 3:
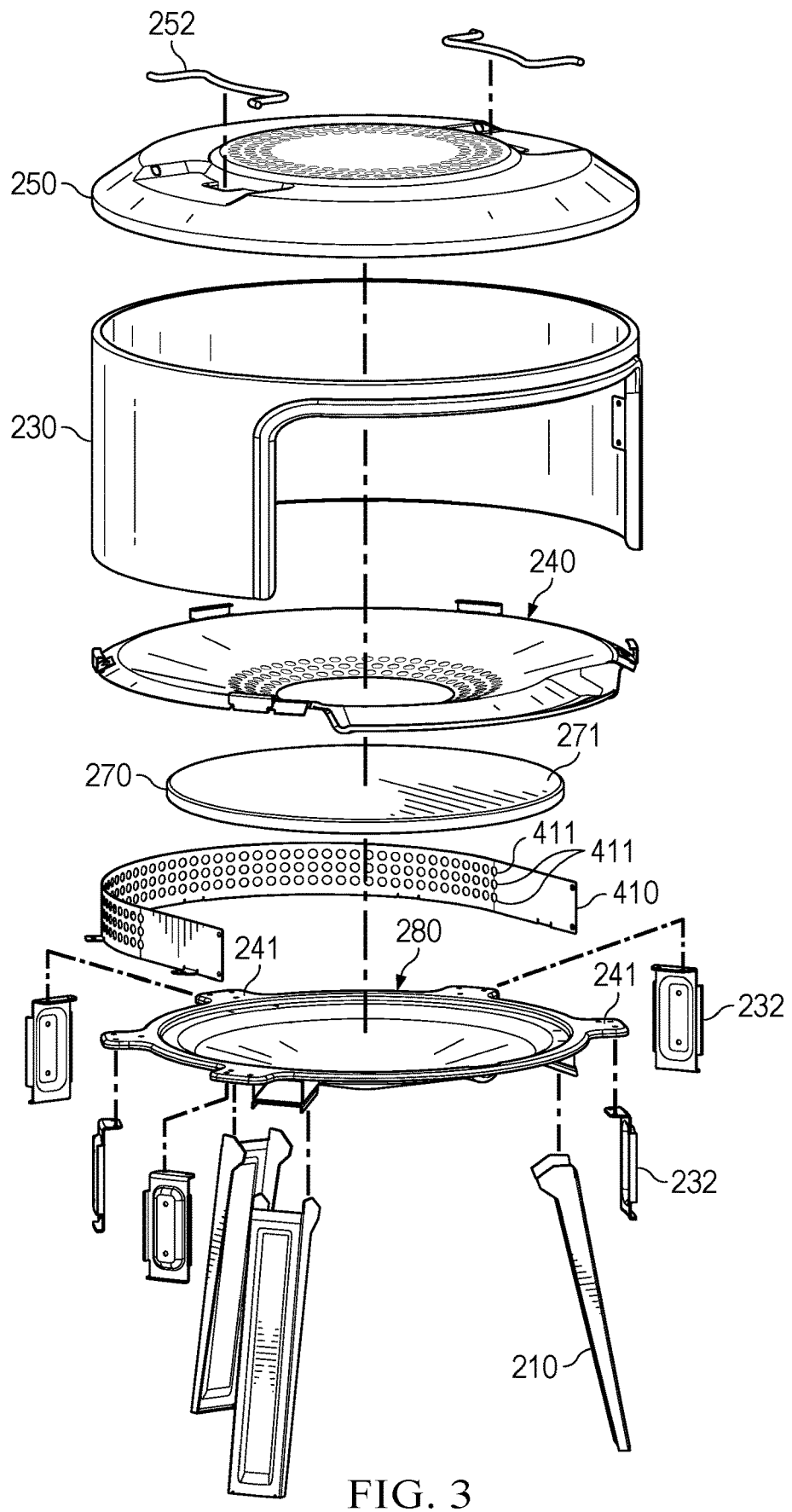
FIG. 3 is a perspective, exploded view of an oven, according to aspects of the present disclosure.

FIG. 3 is a perspective, exploded view of an oven according to aspects of the present disclosure. As shown, the oven 200 may include numerous components. However, it is to be understood that any of the components shown and described with reference to FIG. 3 may be combined in any way to form a single unitary component. In addition, the oven 200 may include components additional to those shown in FIG. 3.

As previously described, the oven 200 may include the main body 202 and the one or more legs 210. As shown in FIG. 3, the main body 202 may include lower heat deflector 280, brackets 232, the cooking plate 270, a flame guard 410, a side wall 230, an upper heat deflector 240, an outer wall 250, and handles 252.

When in an assembled condition, upper portions of the legs 210 may be affixed to the lower heat deflector 280. The lower heat deflector 280 may include one or more tabs 241 extending radially outward from the lower heat deflector

280. Additional aspects of the lower heat deflector 280 will be described in more detail with reference to FIG. 5 hereafter.

The oven 200 may additionally include one or more brackets 232. Each of the brackets 232 may be affixed to the tabs 241 of the lower heat deflector 280. The brackets 232 may additionally be coupled to an inner surface of the side wall 230, thereby connecting the lower heat deflector to the side wall 230. In this way, the lower heat deflector 280 is positioned within the interior space defined by the side wall 230. In some aspects, the tabs 241 of the lower heat deflector 280 and the brackets 232 may be sized and shaped similarly, such that the lower heat deflector 280 is centrally aligned with the side wall 230.

The cooking plate 270 may be positioned on and carried by the lower heat deflector 280. In some aspects, the cooking plate 270 may rest on the lower heat deflector 280. In some aspects, the cooking plate 270 may additionally be coupled to the lower heat deflector 280. In some aspects, the cooking plate 270 may be removable by a user of the oven 200. For example, the cooking plate 270 may be removed and replaced as needed. The cooking plate 270 may include a cooking surface 271 that may be configured to support food items, such as pizza or other similar food items. In the example shown, the cooking surface 271 is an upward facing surface of the cooking plate 270.

As shown in FIG. 3, the cooking plate 270 may be centrally aligned with the lower heat deflector 280 and/or any various other components of the oven 200 shown. In some aspects, features of the lower heat deflector 280 and/or the cooking plate 270 may cause the cooking plate 270 and the lower heat deflector 280 to mate with one another so that they are centrally aligned. For example, a ridge 281 of the lower heat deflector 280 may be sized and shaped to correspond to the size and shape of the cooking plate 270 as will be described in more detail with reference to FIG. 5.

FIG. 3 additionally depicts a flame guard 410. In some aspects, the flame guard 410 may alternatively be referred to as a heat guard, a heat shield, a heat barrier, or any other suitable term. As shown in FIG. 3, the flame guard 410 may extend around a portion of the perimeter of the cooking plate 270. In some aspects, the flame guard 410 may extend around half of the perimeter of the cooking plate 270. In other aspects, the flame guard 410 may extend around greater or lesser portions of the perimeter of the cooking plate 270.

In some aspects, the flame guard 410 may shield the outer edge of the cooking plate 270 from heat helping to warm the cooking surface 271 of the cooking plate 270 uniformly. As additionally shown in FIG. 3, the flame guard 410 may include one or more holes 411 formed therethrough to permit the flow of heated air across the cooking surface 271. IN this example, the holes 411 are formed in rows forming a hole array. The number and placement of these holes may be selected to provide desired heat flow characteristics. In some aspects, the flame guard 410 may be affixed to the lower heat deflector 280 around the cooking plate 270.

The oven 200 additionally includes a side wall 230. In the example shown, the side wall 230 may include a curved wall arranged in a circular shape around the components described previously. In that regard, the side wall 230 may be referred to as a curved side wall that forms the external perimeter of the main body 202 of the oven 200. In some aspects, the side wall 230 may define the interior region of the oven 200. in the example shown, the side wall 230 may include an open top and an open bottom, as well as a section defining the access opening 234 described previously. As shown in FIG. 3, an upper heat deflector 240 may be positioned within the open top defined by the side wall 230, and the outer wall 250 may close the open top of the side wall 230 creating the main body or a housing defined by the side wall 230 and the outer wall 250 with a closed top and an open bottom.

Referencing FIGS. 1-3, the lower heat deflector, the brackets 232, the flame guard 410, and cooking plate 270 may all be positioned within the interior defined by the side wall 230. The lower heat deflector 280, the flame guard 410, and the cooking plate 270 may all be centrally aligned. In this configuration, a gap between the interior surface of the side wall 230 and the combination of the lower heat deflector 280, flame guard 410, and cooking plate 270 may allow heat to flow upward and over the cooking surface 271 of the cooking plate 270, as will be described in greater detail with reference to FIG. 6.

The upper heat deflector 240 is also shown in FIG. 3. In some aspects, the upper heat deflector 240 may be affixed to a top portion of the side wall 230 and may close the open top of the side wall 230. The upper heat deflector 240 may also be referred to as a top wall, an upper wall, a ceiling, a reflective ceiling, or any other suitable term. The upper hear deflector 240 may be shaped according to an inverted dome extending downward toward the cooking surface 271 of the cooking plate 270 at a central portion. One or more ventilation holes that facilitate heated air flow may also be positioned at or near the central portion of the upper heat deflector 240. The locations and dimensions of the inverted dome and holes may maximize even distribution of heat at the cooking surface 271 of the cooking plate 270, as will be described in more detail hereafter.

FIG. 3 additionally depicts the outer wall 250 of top surface of the oven 200. The outer wall 250 may additionally be referred to as an outer shell, an upper wall, an outer shell, or by any other term. Like the upper heat deflector 240 described previously, the outer wall 250 may be affixed to an upper portion of the side wall 230. In this way, the upper heat deflector 240 and the outer wall 250 may together form a baffle, such as an upper baffle, closing the top of the side walls 230. The outer wall 250 may be of any suitable shape. In some aspects, the outer wall 250 may include one or more ventilation holes that facilitate airflow of heated air. The size and locations of the holes of the outer wall 250 may correspond to the size and locations of the holes of the upper heat deflector 240. For example, the holes of the outer wall 250 and the holes of the upper heat deflector 240 may be vertically aligned.

With reference to FIG. 3, it is noted that any of the components shown and described may be of any suitable shape. In the example shown, the lower heat deflector 280, cooking plate 270, upper heat deflector 240, side wall 230, and outer wall 250 as shown in FIG. 3 are all of a generally circular profile. The other components of FIG. 3 are similarly sized corresponding to this general circular shape or configuration. In that regard, the oven 200 includes a generally cylindrical shape in the implementation shown. However, any other arrangement or shape of these parts is contemplated. For example, any of these components may be alternatively of a square shape, oval shape, or any other geometric or non-geometric shape.

FIG. 3 additionally depicts one or more handles 252. The handles 252 may be disposed on the outer wall 250 at a top surface of the oven 200 as shown. As shown, corresponding recesses may be positioned within the outer wall 250. The handles 252 may be hingedly affixed to the outer wall 250 such that the handles 252 may rotate between a deployed configuration and a collapsed configuration. In a collapsed configuration, the handles 252 may be positioned within the corresponding recess of the outer wall 250. Alternatively, the handles 252 may be affixed to the oven 200 so as not to rotate. In addition, the handles 252 may be affixed to any other suitable component of the oven 200 and at any other location. For example, the handles 252 may be affixed to the outer surface of the side wall 230 (e.g., on opposing sides), or at any other locations. In use, the handles are secured to the top or outer wall 250 of the oven, and the top wall 250 is secured to the upper heat deflector so that the whole oven is fastened together, with the exception of the removable cooking plate 270, which may be maintained in place by the force of gravity and the shape of the lower heat deflector 280. The various components may be secured by fasteners, such as screws, or with welding, adhesives, or other attachment systems and methods.

Figure 4:
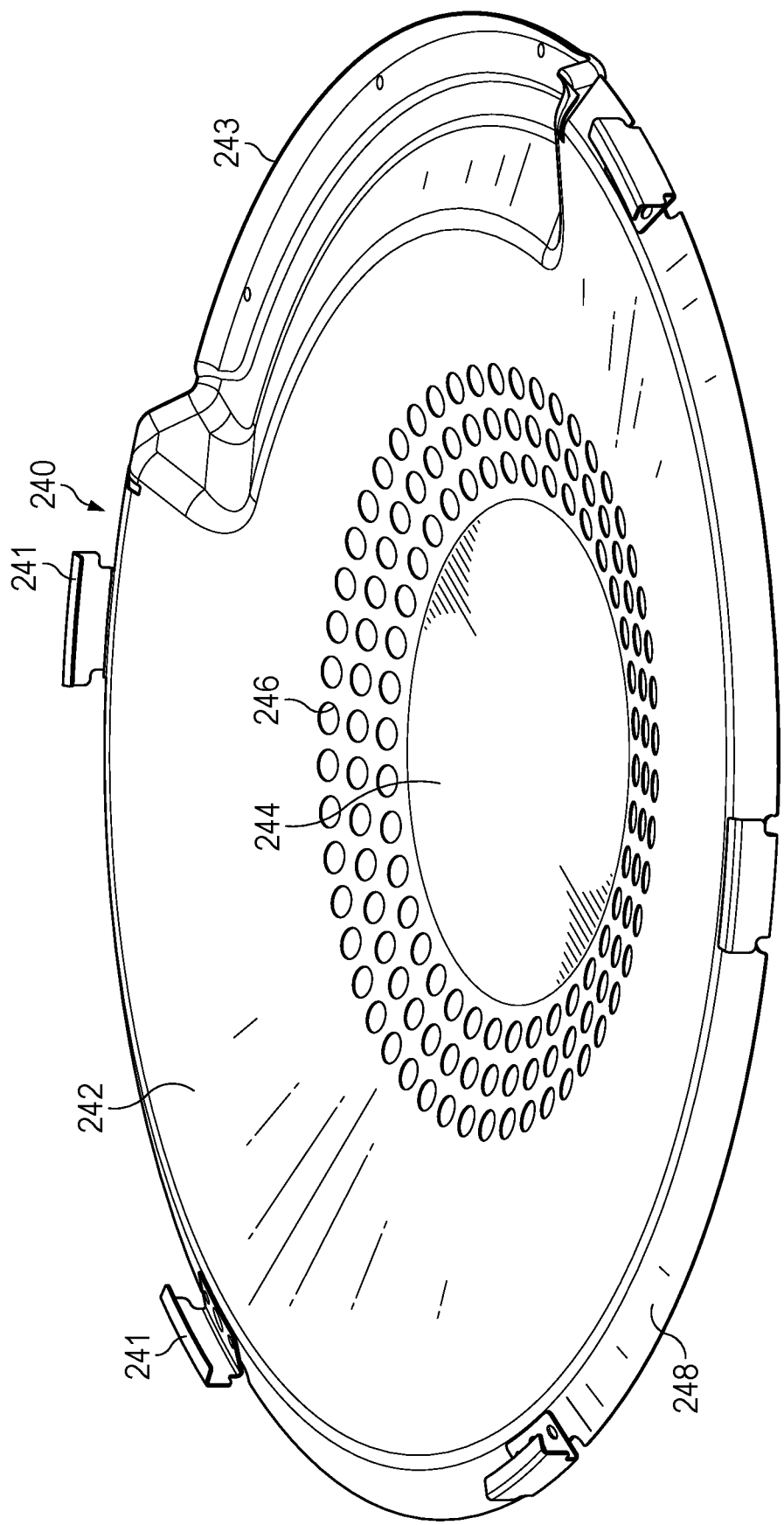
FIG. 4 is a perspective view of an upper heat deflector, according to aspects of the present disclosure.

FIG. 4 is a perspective view of the upper heat deflector 240, according to aspects of the present disclosure. The upper heat deflector 240 may include multiple coupling tabs 241, an opening 243 formed in a perimeter edge, an inverted dome or concave surface including an angled surface 242 and a central region 244, an angled perimeter 248, and a plurality of ventilation holes 246 allowing passage of heated air.

As shown in FIGS. 1-3, the upper heat deflector 240 may be affixed to an upper portion of the side wall 230. In the example shown, the upper heat deflector 240 may be affixed to the side wall 230 by the multiple coupling tabs 241. For example, the coupling tabs 241 may be positioned at various locations around the perimeter of the upper heat deflector 240. In some aspects, the coupling tabs 241 may be part of the same unitary structure as the upper heat deflector 240. In other aspects, the coupling tabs 241 may be affixed to the perimeter of the upper heat deflector 240. For example, the coupling tabs 241 may be affixed to the upper heat deflector 240 with fasteners, such as screws, bolts, nuts, rivets, or any other suitable fasteners. In some aspects, the coupling tabs 241 may be welded to the upper heat deflector 240.

The angled surface 242 and the central region 244 may together form an inverted dome. The inverted dome of the upper heat deflector 240 may facilitate heat flow across the cooking surface 271 of the cooking plate 270 as will be described in greater detail with reference to FIG. 6. In some aspects, the angled surface 242 may be configured such that when the upper heat deflector 240 is installed within the oven 200, the upper heat deflector 240 forms an upper wall, roof, or ceiling to the cooking chamber of the oven 200. Due to the shape of the inverted dome formed by the angled surface 242 and the central region 244, an outer perimeter of the upper heat deflector 240 is positioned vertically higher within the oven 200 than the central region 244 and converges toward the central region 244. For example, as shown in FIG. 4, the angled surface 242 may be angled with respect to the cooking surface 271 (e.g., see FIGS. 3, 6-7, and 9). The angle of the angled surface 242 with respect to the cooking surface 271, which may define a horizontal planar surface of the oven 200, may be consistent at all regions of the angled surface 242. In some aspects, the angled surface 242 and the central region 244 may together form a frustoconical structure. This frustoconical structure may additionally be referred to as a frustoconical protrusion or an inverted frustoconical cone. The angled surface 242 may be conical in nature, or may be concave in nature, depending on the implementation.

The angled perimeter 248 is also shown in FIG. 4. The angled perimeter 248 may be angled with respect to a horizontal plane of the oven 200 in an opposite direction of the angled surface 242. In some aspects, the angle of the angled surface 242 and the angled perimeter 248 may be the same, may be opposite, or may be related in any other way.

FIG. 4 additionally depicts the plurality of ventilation holes 246. In the example shown in FIG. 4, the plurality of holes 246 may be positioned around an outer perimeter of the flat central region 244. These holes 246 may be positioned within the angled surface 242. The holes 246 may be positioned at any other suitable location within the upper heat deflector 240. For example, the holes 246 may additionally or alternatively be positioned within the central region 244. The holes 246 may additionally be positioned closer to the outer perimeter of the upper heat deflector 240. In some aspects, and as will be discussed in greater detail with reference to FIG. 6, the position of the holes 246 within the upper heat deflector 240 may facilitate heat flow to provide uniform heating of the cooking surface 271. In some aspects, the holes 246 may be arranged symmetrically about the central region 244. In other aspects, the holes 246 may be arranged according to any other suitable pattern, including according to any geometric or non-geometric shapes, or may not be arranged in a symmetrical configuration.

Figure 9:
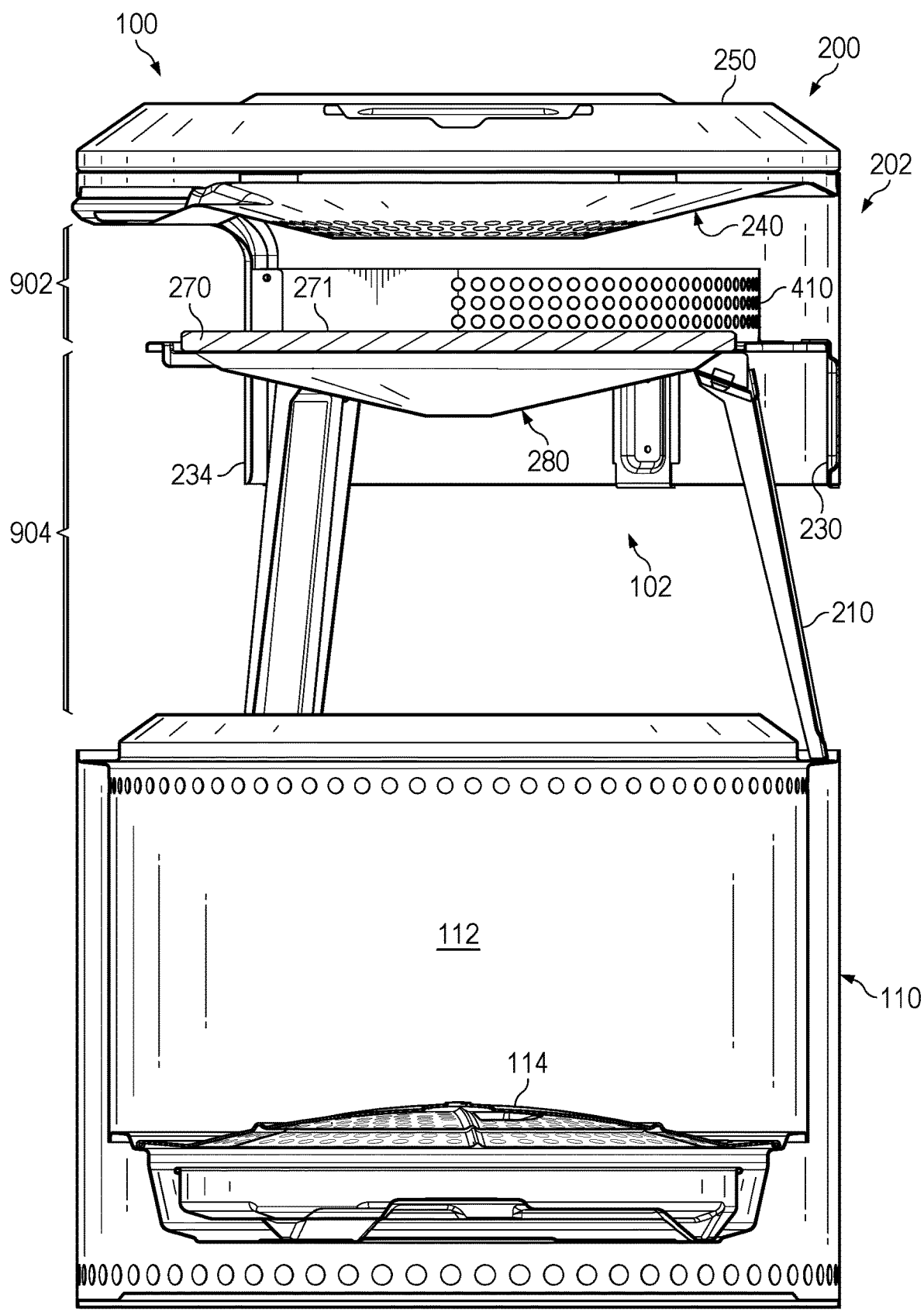
FIG. 9 is a cross-sectional side view of an oven on a fire pit, according to aspects of the present disclosure.

The opening 243 within the upper heat deflector 240 may correspond to and may mate with the upper edge of the access opening 234 of the oven 200 shown in FIG. 2. A cross-sectional side view of this is shown in FIG. 9. In some aspects, the opening 243 of the upper heat deflector 240 may be shaped and positioned relative to the rest of the upper heat deflector 240 so as to accommodate the opening 234 within the oven 200. In this way, a user of the oven 200 may be provided greater access to the interior of the oven 200.

It is noted that any of the dimensions or arrangements of components of the upper heat deflector 240 shown in FIG. 4 may be altered in any suitable way. For example, dimensions of the angled surface 242, the central region 244, holes 246, angled perimeter 248 may be adjusted to accommodate varying diameters or other sizes of the oven 200 and/or the fire pit 110.

Figure 5:
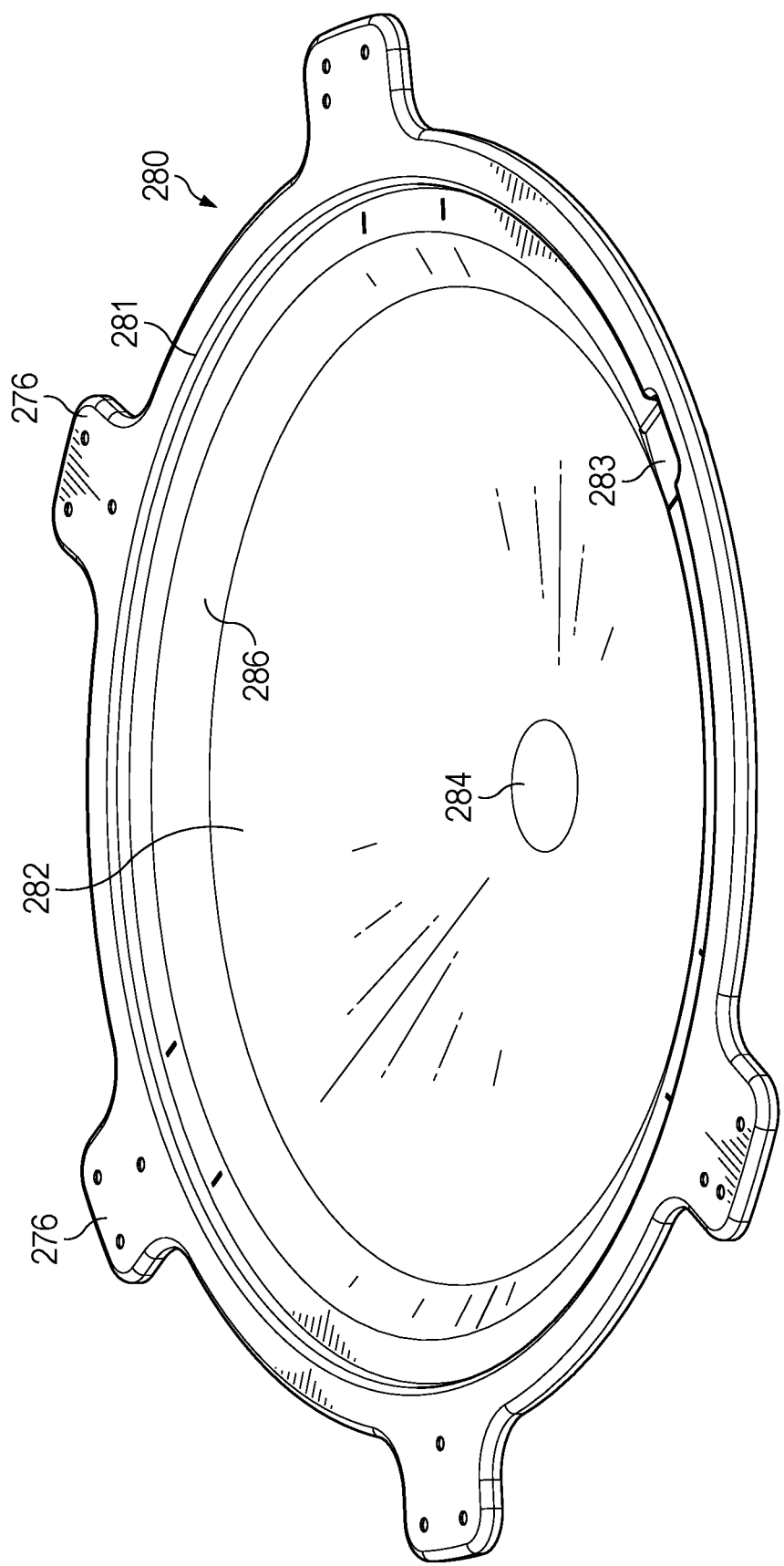
FIG. 5 is a perspective view of a lower heat deflector, according to aspects of the present disclosure.

FIG. 5 is a perspective view of the lower heat deflector 280, according to aspects of the present disclosure. The lower heat deflector 280 may be sized and shaped to be positioned beneath the cooking plate 270, as described herein. For example, the lower heat deflector 280 may serve to support the cooking plate 270. The lower heat deflector 280 includes multiple tabs 276, an angled perimeter 286, an angled surface to 282, and a central region 284. In some aspects, the lower heat deflector 280 may additionally be referred to as a conical bottom heat guide. Although described as conical, in some implementations the lower heat deflector is curved with a bowl-shape.

Like the angled surface 242 and the central region 244 described with reference to FIG. 4, the curved angled surface 282 and the central region 284 of the lower heat deflector 280 shown in FIG. 5 may form a frustoconical structure. This frustoconical structure may additionally be referred to as a frustoconical protrusion or an inverted frustoconical cone. In some aspects, the frustoconical structure formed by the surface 282 and the central region 284 may serve to direct heat to the outer perimeter of the lower heat deflector 280 such that the heat rises wrapping around all sides of the lower heat deflector 280 to facilitate uniform heating of the cooking surface 271 of the cooking plate 270. Like the angled surface 242 of FIG. 4, the curved angled surface 282 may be angled with respect to a horizontal plane of the oven 200, such as the cooking surface 271. In some aspects, the angle of the angled surface 282 may be consistent from the outermost locations of the curved angled surface to the innermost locations of the curved angled surface meeting the central region 284. In some aspects, the value of this angle of the angled surface 282 with respect to the horizontal plane of the cooking surface 271 may be equal to the angle of the angled surface 242 described previously. In some aspects, the angle of the curved angled surface 282 may differ.

The angled perimeter 286 shown in FIG. 5 may also be angled with respect to the horizontal plane of the cooking surface 271. In some aspects, the value of the angle of the angled perimeter 286 may be different from the value of the angle of the curved angled surface 282. In some aspects, the value of the angle of the angled perimeter 286 and the value of the angle of the angled surface 282 may be the same.

As shown in FIG. 5, the lower heat deflector 280 also includes the tabs 276. In some aspects, referring to FIG. 3, the tabs 276 may provide locations on the lower heat deflector 280 at which the brackets 232 are coupled to the lower heat deflector 280. These brackets 232 may be additionally coupled to the side wall 230 such that the side wall 230 and its corresponding components (e.g., the upper heat deflector 240 and the outer wall 250) are positioned around and above the cooking plate 270. The location of the tabs 276 within the lower heat deflector 280 may be selected such that the cooking plate 270 is centrally aligned with any other components of the oven 200.

It is additionally noted that the lower heat deflector 280 may include a ridge 281 extending around the perimeter of the lower heat deflector 280. The ridge 281 may correspond to the shape of the cooking plate 270. In this way, the ridge 281 may retain the cooking plate 270 within the lower heat deflector 280. For example, a user of the oven 200 may place the cooking plate 270 on the lower heat deflector 280 within the recess defined by the ridge 281. This ridge 281 may be sized and shaped so as to align the cooking plate 270 with the lower heat deflector 280 and any other components of the oven 200. The lower heat deflector 280 may additionally include a recess 283. The recess 283 may be positioned within the lower heat deflector at a forward location, such as a location near the opening 234 of the oven 200 (FIG. 2). The recess 283 may facilitate placement and/or removal of the cooking plate 270 within the ridge 281 of the lower heat deflector 280. For example, as a user of the oven 200 places the cooking plate 270 on the lower heat deflector 280 within the ridge 281, the recess 283 may provide space for a finger of the user to facilitate safe installation of the cooking plate 270. Similarly, the recess 283 may allow a user to grasp an edge or underside of the cooking plate 270 to lift the cooking plate 270 up from the lower heat deflector 280.

Like the upper heat deflector 240, it is noted that any of the dimensions or arrangements of components of the lower heat deflector 280 shown in FIG. 5 may be altered in any suitable way. For example, dimensions of the angled surface 282, the central region 284, angled perimeter 286 may be adjusted to accommodate varying diameters or other sizes of the oven 200 and/or the fire pit 110.

Figure 6:
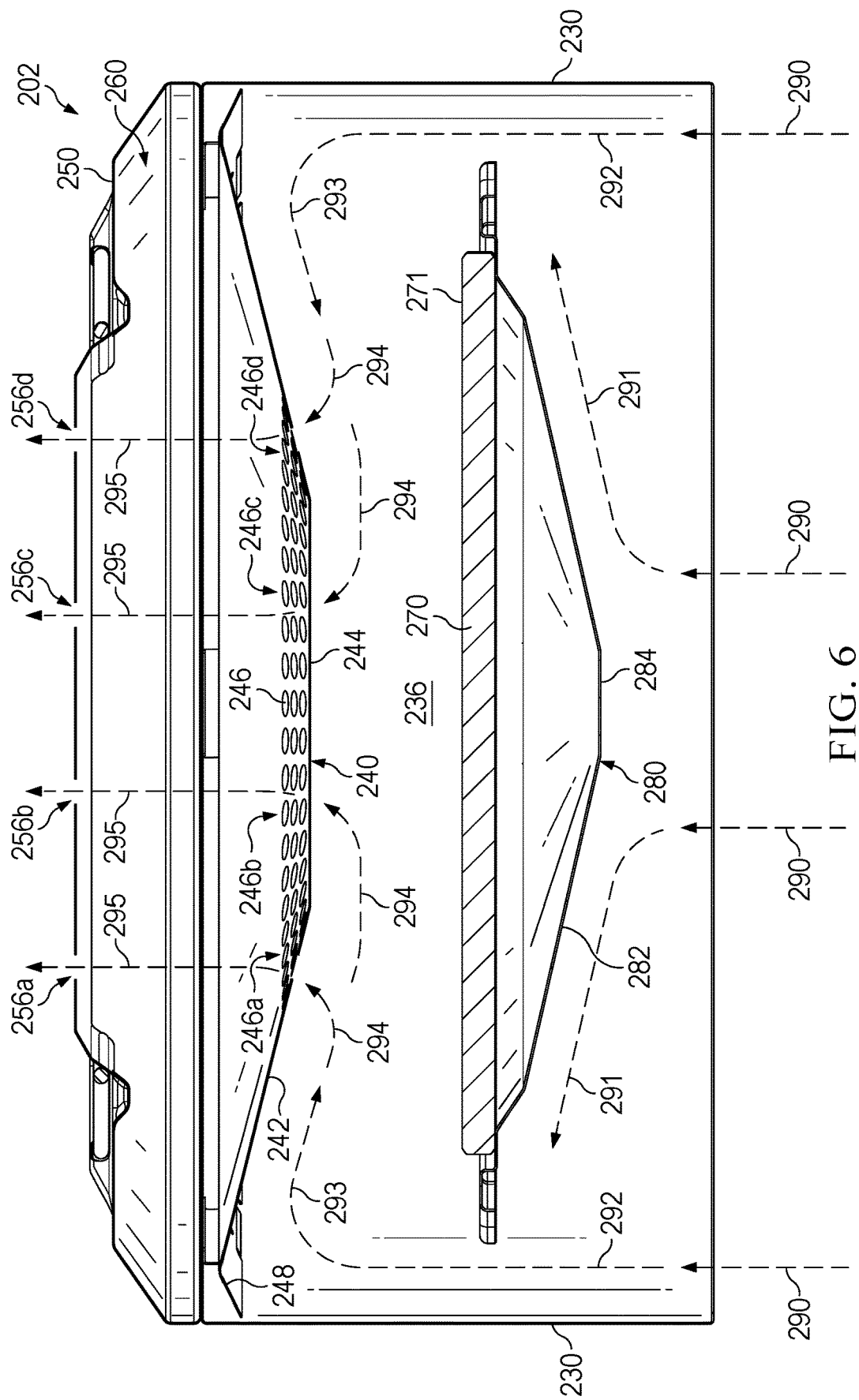
FIG. 6 is a cross-sectional side view of an oven, according to aspects of the present disclosure.

FIG. 6 is a cross-sectional side view of the main body 202 of the oven 200, according to aspects of the present disclosure. The cross-sectional side view shown in FIG. 6 may provide additional details of the components of the oven 200. Various aspects of the components of the oven 200 will be described with reference to the flow of heated air within the oven 200. As shown in FIG. 6, the curved side wall 230 and the upper heat deflector 240 may form an enclosed top and define an open bottom. Thus, the side wall 230 and the top or outer wall 250 of the main body 202 define an interior heating chamber that contains the lower heat deflector 280, the cooking plate 270, and the upper heat deflector 240. Within this interior, the side wall 230, the cooking surface 271 of the cooking plate, and the upper heat deflector 240 define the cooking chamber 236.

As shown in FIGS. 1-2 and 9, the oven 200 may be configured to be positioned over a fire pit (e.g., the fire pit 110). However, the oven 200 may be positioned over any suitable heat source, such as campfire, propane fire, a grill, an electrical heating element, or any other suitable heat source.

The arrows 290 represent flowing heated air from the heat source over which the oven 200 is positioned. The heated air may rise and enter the open bottom of the oven 200. As described previously, the side walls 230, as well as the upper heat deflector 240, may together form an interior heating chamber or heatable chamber with an open bottom. The bottom of the oven 200 may be intentionally left open to receive heated air as shown by the arrows 290.

After the heated air shown by the arrows 290 enters the open bottom of the oven 200, the lower heat deflector 280 may redirect portions of the heated air. For example, heated air from the heat source which enters the open bottom of the oven 200 beneath the lower heat deflector 280 may be redirected around the lower heat deflector 280 and the cooking plate 270. Heated air which enters the open bottom of the oven 200 not beneath the lower heat deflector 280 may rise within the chamber of the oven 200 via gaps between the lower heat deflector and the side wall that created unobstructed passages at the sides of the cooking plate 270, as shown by the arrows 292. Although the cross section shown in FIG. 6 illustrates heat rising around two opposite sides of the cooking plate 270 (e.g., a right side and a left side), it is understood that heated air shown by the arrows 292 and 291 rises and around the cooking plate 270 at all locations around the perimeter of the cooking plate 270. Because the cooking plate 270 is heated from all sides, the uniformity of heating of the cooking surface 271 of the cooking plate 270 and any food placed on the cooking surface 271 is improved.

As shown in FIG. 6, as the heated air rises above the cooking surface 271 it is again redirected in several ways. For example, the angled perimeter 248 and the angled surface 242 of the upper heat deflector 240 may direct the heated air which rises around all sides of the cooking plate 270 inward and downward as shown by the arrows 293. In some aspects, the angle of the angled perimeter 248 may be selected to optimally redirect the heated air rising as shown by the arrows 292 inward and downward as shown.

As the heated air moves inward and downward, as shown by the arrows 293, it is drawn towards the central region 244 of the upper heat deflector 240 due, at least in part, to the holes 246. As shown by the arrows 294, the heated air may exit the chamber of the oven 200 through the holes 246. This heated air may pass through the baffle 260 defined by the upper heat deflector 240 and the outer wall 250 and escape into the surrounding environment through holes 256 positioned within the outer wall 250. This movement of heated air is illustrated by the arrows 295. In some aspects, as the heated air moves through the holes 246 and the holes 256 and leaves the enclosure, a vacuum is created such that heated air is drawn from the outer regions within the oven chamber (e.g., regions corresponding to the arrows 292 and 293 in FIG. 6) and toward the central region of the oven chamber. The inverted dome shape of the upper heat deflector 240 may ensure that as heated air is received through the open bottom of the oven 200 and redirected at the outer perimeter (e.g., arrows 293), it is drawn downward toward the center of the cooking surface 271, thereby providing heat to the central region of the cooking surface 271. In this way, the inverted dome shape of the upper heat deflector 240 facilitates uniform heating of the cooking surface 271. Various aspects of how the cooking surface 271 is uniformly heated will be described in greater detail with reference to FIG. 8 hereafter.

FIG. 6 additionally illustrates that the holes 246 of the upper heat deflector 240 and the holes 256 of the outer wall 250 may be vertically aligned. For example, a hole 246a within the upper heat deflector 240 may be vertically aligned with a corresponding hole 256a of the outer wall 250. Similarly, a hole 246b may be vertically aligned with the hole 256b, a hole 246c may be vertically aligned with a hole 256c, and so on. In that regard, the outer wall 250 may include the same number of holes 256 as the holes 246 of the upper heat deflector 240. In some aspects, this alignment of the holes 246 and the holes 256 may facilitate heated air passing through the baffle 260 and into the surrounding environment, thus maximizing airflow through the oven 200 and facilitating uniform heating of the cooking surface 271. In other aspects, the holes are laterally offset, and air flow may still occur sufficient to heat the cooking chamber.

Figure 7:
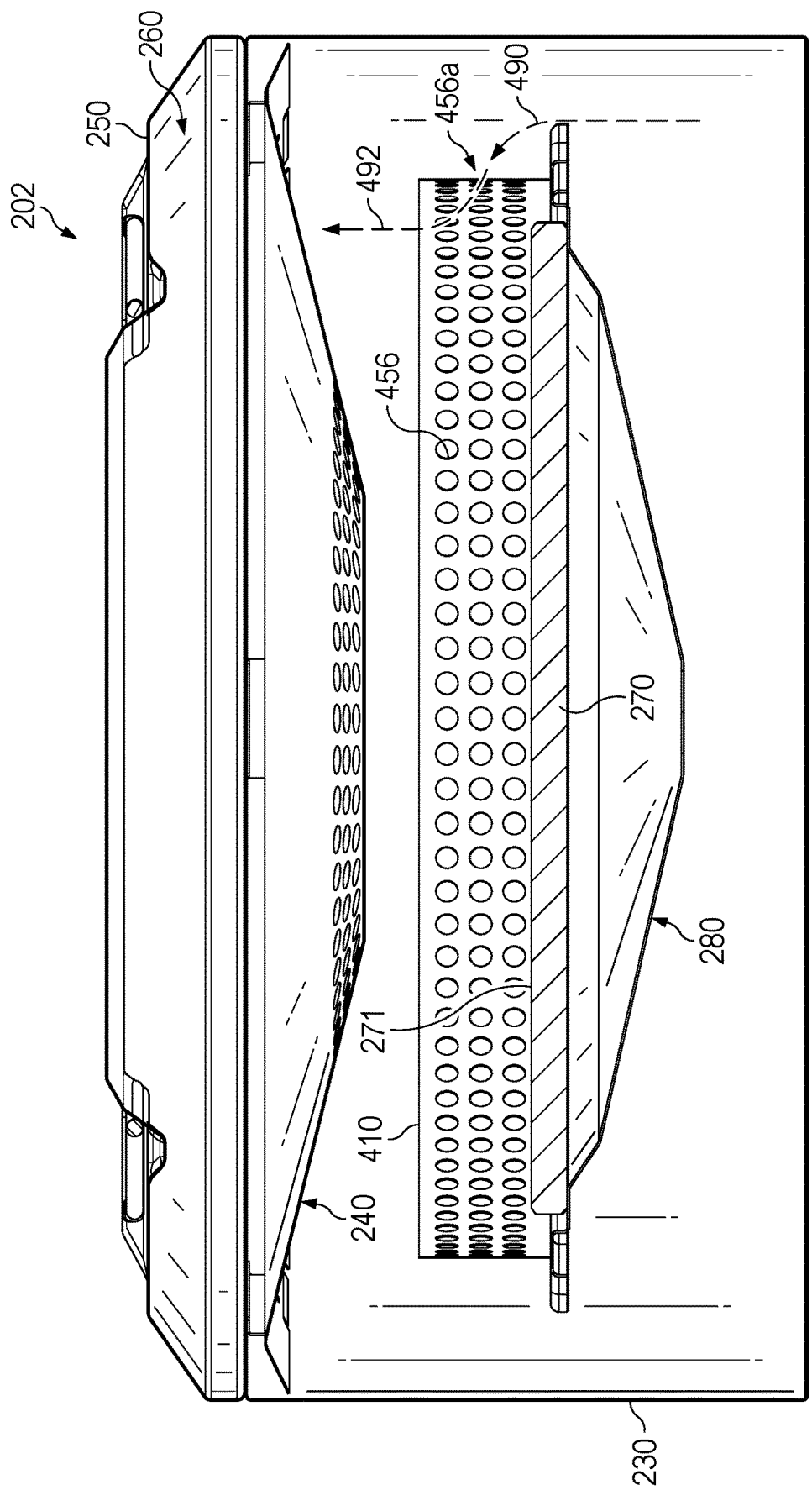
FIG. 7 is a cross-sectional side view of an oven, according to aspects of the present disclosure.

FIG. 7 is a cross-sectional side view of the oven 200, according to aspects of the present disclosure. In some aspects, as shown in FIG. 7, the oven 200 may include the flame guard 410 shown and described with reference to FIG. 3 previously.

Heated air may flow through the oven 200 as shown with reference to FIG. 6. Referring to FIG. 6, the flame guard at the perimeter of the cooking plate 270 may help reduce the likelihood of overheating at the perimeter edge, thereby aiding in the uniform heating. For example, the main airstream described in FIG. 6 may need to flow over (and in part through the ventilation holes) the flame guard 410, facilitating even heating by driving hot air flow to a higher elevation than the edge of the cooking plate 270. For example, referring to FIG. 6, the outermost perimeter of the cooking plate 270 is positioned close to the heated air moving up and around the sides of the cooking plate 270 represented by the arrows 292. Due to this close proximity of the outer perimeter to the heated air moving up and around the sides of the cooking plate 270, the outer perimeter of the cooking surface 271 of the cooking plate 270 may be heated more quickly than other regions of the cooking surface 271. The flame guard 410 shown in FIG. 7 may shield the outermost perimeter of the cooking plate 270 from the direct heat of the heated air moving up and around the cooking plate 270. In this way, the flame guard 410 facilitates uniformly distributed heating of the cooking surface 271 of the cooking plate 270.

As shown in FIG. 7, the flame guard 410 may include multiple ventilation holes 456. In some aspects, the holes 456 allow some heat to flow from outside of the flame guard 410 to the inside of the flame guard 410. For example, heated air may rise and around the lower heat deflector 280 as shown by the arrow 490. While the flame guard 410 protects the outer perimeter of the cooking plate 270 from the direct heat provided by this heated air, a hole 456a of the holes 456 may permit some heated air to flow from the outside of the flame guard 410 to the inside of the flame guard 410 through the hole 456A as shown by the arrow 492. In some aspects, the number of holes 456, as well as the placement of the holes 456, may be selected to maximize uniformity of heating of the cooking surface 271 of the cooking plate 270. In addition, the flame guard may shield food from direct flames from the fire pit when the fire pit is burning with flames that rise into the open bottom of the oven.

In some aspects, the flame guard 410 may be an optional or removable component. For example, depending on the intended use of the oven 200, such as the type of food to be prepared within the oven 200, a user may choose to remove the flame guard 410 from the oven 200. A cross section of the oven 200 in such a configuration is shown in FIG. 6 previously described. In some aspects, a user of the oven 200 may replace the flame guard 410 with various alternative flame guards configured for different purposes. For example, if greater shielding of the cooking plate 270 is desired, a user of the oven 200 may elect to install a flame guard which does not include the holes 456. In other aspects, alternative flame guards may include different numbers of holes 456, different arrangements of holes 456, different shapes of holes 456, or other various features to otherwise alter the flow of heated air within the oven 200.

Figure 8:
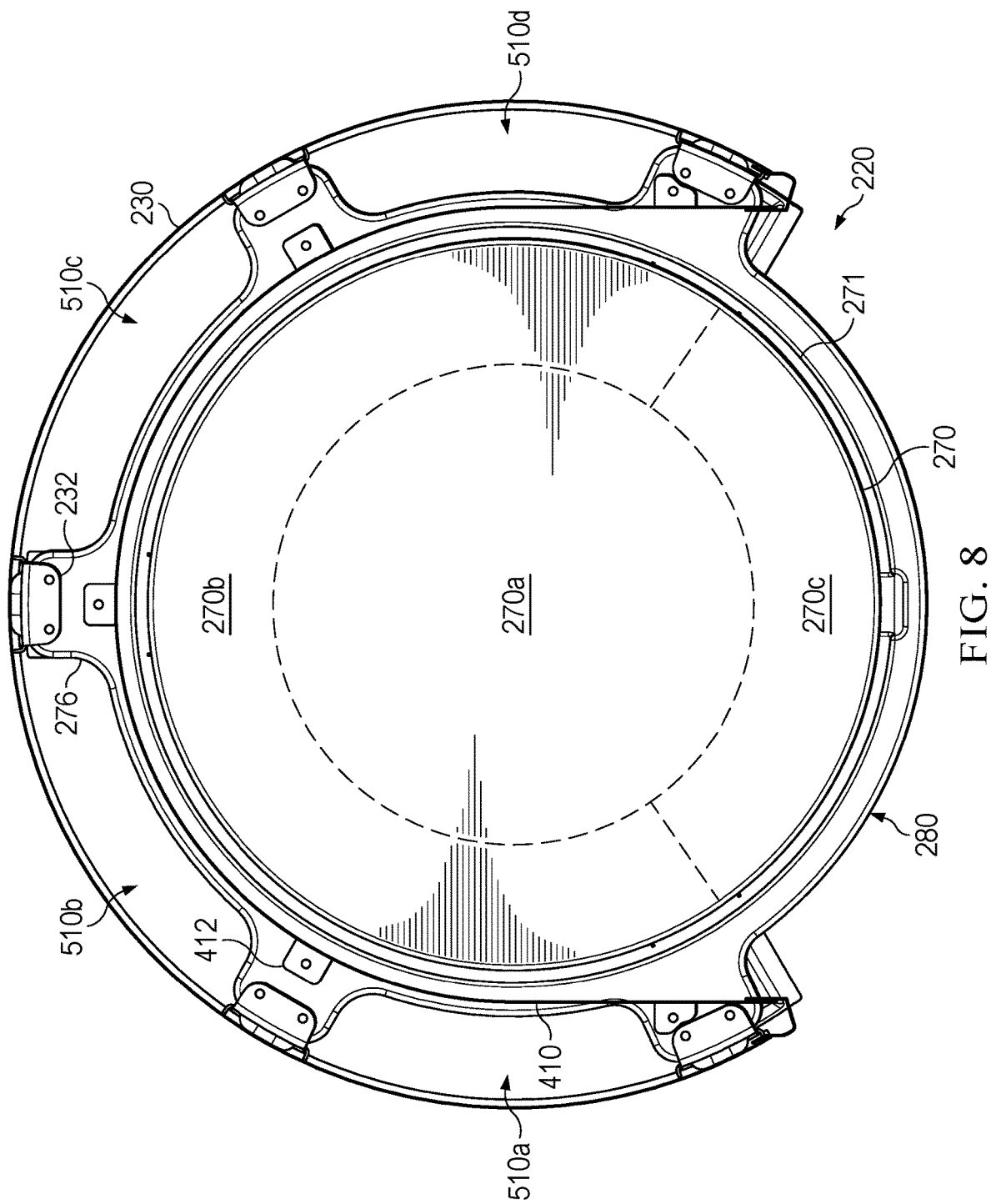
FIG. 8 is a cross-sectional top view of an oven, according to aspects of the present disclosure.

FIG. 8 is a cross-sectional top view of the oven 200, according to aspects of the present disclosure. Aspects of how different regions of the cooking plate 270 are heated to achieve uniform heating of the cooking plate 270 will be described with greater detail with reference to FIG. 8.

The cross-sectional top view of the oven 200 shown in FIG. 8 includes a view of the side wall 230 defining the interior of the oven 200. The brackets 232 are also shown affixed to the inner surface of the side wall 230 at various locations around the perimeter of the oven 200. The tabs 276 of the lower heat deflector 280 are shown affixed to the brackets 232. In this way, the lower heat deflector and cooking plate 270 are suspended within the interior of the oven 200 by the tabs 276 and brackets 232. As shown, the cooking plate 270 is placed on the lower heat deflector 280 within the region defined by the ridge 281.

The flame guard 410 is also shown around a portion of the cooking plate 270. The flame guard 410 may include multiple tabs 412 by which the flame guard 410 may be affixed to the lower heat deflector 280. As shown, the flame guard 410 may include a curved region corresponding to the curvature of the lower heat deflector 280 and the cooking plate 270 as well as two straight regions extending from either side of the curved region. In this way, the curved region of the flame guard may correspond to half of the perimeter of the cooking plate 270. The straight regions of the flame guard 410 may allow food to be inserted through the opening 234 onto the cooking plate 270 without being obstructed by the flame guard 410.

In the configuration shown in FIG. 8, various gaps are created between the inner surface of the side wall 230 and the outer perimeter of the cooking plate 270 and/or the lower heat deflector 280. For example, gaps 510a, 510b, 510c, and 510d are created by the tabs 276 spacing the side wall 230 from the cooking plate 270. In some aspects, any of the gaps 510 may be referred to as convective gaps. As described with reference to FIG. 6 previously, heat from a heat source beneath the cooking plate 270 may be directed by the lower heat deflector 280 around all sides of the lower heat deflector 280 and pass through the gaps 510 shown in FIG. 8. At a front region 220 of the oven 200, due to the opening 234, there are no gaps between the lower heat deflector 280 and the side wall 230 because the side wall 230 is not present to form the opening 234. However, heat from the heat source beneath the oven 200 may similarly rise upward and around the front edge of the heat deflector 280 such that heated air heats the cooking surface 271 of the cooking plate 270 from all sides including from the gaps 510 as well as the opening 234.

FIG. 8 illustrates three distinct regions of the cooking plate 270. The cooking plate 270 may include a central region 270a, a region 270b corresponding to a portion of the outer perimeter of the cooking plate 270, and a region 270c corresponding to a remaining portion of the outer perimeter of the cooking plate 270. The inverted dome shape of the upper heat deflector 240 as well as the flame guard 410 may facilitate uniform heating of the cooking plate 270.

For example, as described with reference to FIG. 6, if the cooking plate 270 were positioned over a heat source without the inverted dome shaped upper heat deflector 240 positioned above the cooking plate 270, the central region 270a of the cooking plate 270 may be heated more slowly than the regions 270b and 270c. For example, if no upper heat deflector were positioned above the cooking plate 270, heated air may pass through the gaps 510 as well as the front region 220, heating the regions 270b and 270c without similarly heating the central region 270a. However, as described with reference to FIG. 6, the inverted dome shape of the upper heat deflector 240, as well as the position of the holes 246 within the upper heat deflector 240, serve to redirect heat from the gaps 510 and front region 220 inward and downward toward the central region 270a of the cooking plate 270.

As described with reference to FIG. 7, if the cooking plate 270 were positioned over a heat source without the flame guard 410, heat from the heated air passing through the gaps 510 may rapidly heat the region 270b. The position of the flame guard 410 about this region 270b serves to slow the heating of the region 270b to match the rate of heating of the central region 270a facilitating uniform heating of the cooking plate 270.

As shown in FIG. 8, the flame guard 410 does not extend around the region 270c. The flame guard 410 may be sized, shaped, and positioned in this way to allow a user to access the interior of the oven 200. However, the flame guard 410 does not shield the region 270c from the close proximity of heated air passing up and around the lower heat deflector 280 at the front region 220. However, heat at this front region 220 may be more easily dissipated away from the cooking plate 270 through the opening 234. In this way, heat at this front region 220 is not as concentrated due to the absence of the side wall 230 at this front region 220. In turn, this may slow the heating of the region 270c to match the rate of heat of regions 270b and 270a. As shown, the flame guard 410 in combination with the inverted dome shape and centrally disposed holes of the upper heat deflector 240 may increase the likelihood that all regions of the cooking plate 270 are heated uniformly. As a result, a user may not need to reposition or rotate food within the oven 200 as frequently during a cooking process.

FIG. 9 is a cross-sectional side view of the oven 200 on the fire pit 110, according to aspects of the present disclosure. As shown and described with reference to FIGS. 1 and 2, the oven 200 may be positioned on top of a fire pit 110. For example, the legs 210 of the oven 200 may be positioned on an upper surface of the outer wall of the fire pit 110. In some aspects, the fire pit 110 may include ridges on an outer wall and an inner wall defining a track along the upper surface of the walls of the fire pit 110. This track may receive the lower end of the legs 210 and prevent the legs 210 from sliding off the top surface of the walls of the fire pit 110. In some aspects, a dimension of the legs 210 may correspond to a dimension of the ridge of the outer wall of the fire pit 110, such that the legs 210 and ridge of the outer wall are alignment features. For example, a width of the legs 210 may correspond to a distance between the ridges of the upper wall of the fire pit 110.

FIG. 9 depicts various aspects of the oven 200 described previously, including the side wall 230, the lower heat deflector 280, the flame guard 410, the upper heat deflector 240, and the outer wall 250.

The arrangement of the oven 200 and the fire pit 110 in FIG. 9 may facilitate maintaining a fire within the fire pit 110 as well as cooking food in the oven 200 simultaneously. For example, because the legs 210 space the oven 200 from the fire pit 110, a gap 904 is created between the cooking plate 270 and/or the lower heat deflector 280 and the upper surface of the fire pit 110. This gap 904 may allow a user of the fire pit 110 and oven 200 to place fuel for the fire within the cavity 112 of the fire pit 110. In some aspects, the cavity 112 of the fire pit 110 may be referred to as a burn chamber. For example, a user of the fire pit 110 and oven 200 may position wood, or any other fuel on the bottom surface 114 of the fire pit 110. In some aspects, the gap 904 may provide greatest access to the user at a front region of the oven 200. However, a user of the oven 200 and fire pit 110 may also add fuel to the cavity 112 of the fire pit 110 from any direction including a rear portion or side portions of the oven 200 because the legs 210 of the oven 200 space the oven 200 away from the top of the fire pit 110. Similarly, the gap 902 between the cooking plate 270 and the top edge of the opening 234 allow a user of the oven 200 to position food on the cooking surface 271 of the cooking plate 270.

In the configuration shown, the heat source providing heat to the oven 200 may be a fire within the cavity 112 of the fire pit 110. This fire may be positioned generally centrally aligned with the oven 200. In this way, heated air from the fire within the cavity 112 may rise through the open bottom 102 of the oven 200 and be directed by the various components of the oven 200 as described previously.

As shown in FIG. 9, as well as FIGS. 1 and 2 described previously, a width of the oven 200 may correspond to a width of the fire pit 110. For example, an outer diameter of the fire pit 110 may be the same as the outer diameter of the oven 200. In some aspects, an inner diameter of the fire pit (e.g., a distance between the inner walls of the burn chamber or cavity 112 referred to as a burn chamber width) may be the same as the inner diameter of the oven 200 (e.g., a distance between the inner surfaces of the side wall 230 referred to as an open bottom width). Because the diameter of the oven 200 corresponds to the fire pit 110, heat from the fire pit 110 a majority of heated air emanating from the fire pit 110 may be captured within the heating chamber of the oven 200. In some aspects, these dimensions may vary. For example, the diameter of the oven 200 may be greater or less than the diameter of the fire pit 110. For example, the open bottom width may be within a range of 40% to 100% of the burn chamber width.

Persons of ordinary skill in the art will appreciate that the implementations encompassed by the present disclosure are not limited to the particular exemplary implementations described above. In that regard, although illustrative implementations have been shown and described, a wide range of modification, change, combination, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A cooking system for cooking over a fire comprising:
    a cooking surface configured to support food items above the fire;
    an open bottom configured to allow cooking heat from the fire to enter the cooking system and cook on the cooking surface; and
    a first heat deflector, comprising:
        a side wall disposed at a side of the cooking surface;
        a top wall above the cooking surface, the cooking surface and the top wall defining a cooking chamber, the top wall being angled with respect to the cooking surface such that the top wall includes an upper portion adjacent the side wall and a lower portion extending over the cooking surface; and
        a first plurality of holes disposed at the lower portion of the top wall.

2. The cooking system of claim 1, wherein the top wall forms an inverted dome.

3. The cooking system of claim 2, wherein the inverted dome is an inverted frustoconical cone.

4. The cooking system of claim 1, further comprising a second heat deflector below the cooking surface configured to direct heat toward an outer perimeter of the cooking surface.

5. The cooking system of claim 4, wherein the second heat deflector and cooking surface form a baffle.

6. The cooking system of claim 1, wherein the side wall is a curved wall extending around a perimeter of the cooking surface.

7. The cooking system of claim 6, wherein the side wall includes an opening configured to provide access to the cooking surface.

8. The cooking system of claim 7, further comprising a door hingedly coupled to a side of the opening and configured to allow selective access to the cooking surface.

9. The cooking system of claim 1, wherein the side wall extends below the cooking surface.

10. The cooking system of claim 1, further comprising an outer wall above the top wall, the outer wall including a second plurality of holes.

11. The cooking system of claim 10, wherein the outer wall and the top wall form a baffle.

12. The cooking system of claim 10, wherein a number of the second plurality of holes corresponds to a number of the first plurality of holes and the second plurality of holes are vertically aligned with the first plurality of holes.

13. The cooking system of claim 1, further comprising one or more legs configured to space the cooking surface above a heat source.

14. The cooking system of claim 13, wherein the one or more legs include alignment features configured to centrally align the cooking system over a fire pit.

15. The cooking system of claim 1, wherein the cooking surface is solid.

16. A cooking system for cooking over a fire, comprising:
    a cooking surface; and
    a heat deflector, comprising:
        a side wall disposed at a side of the cooking surface, the side wall forming an open bottom configured to allow cooking heat from the fire to enter the cooking system and cook on the cooking surface; and
        an inverted dome above the cooking surface, the inverted dome being angled with respect to the cooking surface such that the inverted dome includes an upper portion and a lower portion, the lower portion aligned with a central region of the cooking surface.

17. The cooking system of claim 16, wherein the lower portion of the inverted dome includes a plurality of holes.

18. The cooking system of claim 16, wherein the inverted dome is centrally aligned with the cooking surface.

19. The cooking system of claim 16, wherein a width of the inverted dome is greater than a width of the cooking surface.

20. The cooking system of claim 16, wherein an outer perimeter of the inverted dome includes a surface angled opposite the angle of the inverted dome.

21. A cooking system for cooking over a fire, comprising:
    a cooking surface disposed to support food items;
    one or more upwardly extending side walls on opposing sides of the cooking surface, the side walls extending from below the cooking surface to above the cooking surface and being spaced from the cooking surface to form a convective gap at opposing sides of the cooking surface, the upwardly extending side walls defining an open bottom of the cooking system configured to allow cooking heat from the fire to enter the cooking system and cook on the cooking surface;
    a reflective ceiling extending over the cooking surface; and
    one or more legs configured to space the cooking system from the fire.

22. The cooking system of claim 21, further comprising a conical bottom heat guide beneath and centrally aligned with the cooking surface.

23. The cooking system of claim 22, wherein the conical bottom heat guide is positioned between the upwardly extending side walls and vertically above a bottom edge of the upwardly extending side walls.

24. The cooking system of claim 21, further comprising:
    a flame guard positioned about a portion of a perimeter of the cooking surface, the flame guard including a vertical wall extending upward from the portion of the perimeter of the cooking surface.

25. The cooking system of claim 24, wherein the flame guard includes a plurality of holes.

26. The cooking system of claim 24, wherein the flame guard is positioned about at least 25% of the perimeter of the cooking surface.

27. A cooking system for cooking over a fire, comprising:
    a cooking surface disposed to support food items; and
    a heat deflector coupled to the cooking surface, the heat deflector positioned over the cooking surface and angled with respect to the cooking surface, the cooking surface and the heat deflector defining a cooking chamber; and
    wherein the cooking surface and the heat deflector are configured to be positioned over a fire pit via one or more legs extending from the cooking system to the fire pit.

28. An oven configured to be positioned above a heat source, the oven comprising:
    a heat deflector including a curved side wall and a top wall forming a chamber with an open bottom configured to receive heated air from the heat source; and
    a cooking surface positioned within the chamber such that the heated air flows around the cooking surface,
    wherein the top wall of the heat deflector includes a frustoconical protrusion positioned above, and centrally aligned with, the cooking surface and a plurality of holes at a central region of the protrusion, such that the heated air is directed by the protrusion radially inward and downward before passing through the plurality of holes and wherein the heat deflector and cooking surface are spaced from the heat source by one or more legs.

29. The oven of claim 28, wherein the cooking surface includes a perimeter and the heated air flows upward and around all sides of the perimeter of the cooking surface.

30. A cooking system for cooking over a fire, comprising:
a cooking surface disposed to support food items and having a first width; and
a main body disposed about the cooking surface, the main body having an enclosed top and an open bottom creating a heatable chamber, the open bottom having a second width equal to or greater than the first width, the cooking surface being disposed in the heatable chamber, the main body having one or more legs for spacing the main body from the fire.

31. The cooking system of claim 30, wherein the main body comprises a side opening configured to provide access to a cooking chamber defined by the cooking surface and the enclosed top.

32. A cooking system comprising:
a fire pit having a burn chamber; and
an oven disposed above the burn chamber of the fire pit, the oven having:
an open bottom forming a heatable chamber spaced from the burn chamber of the fire pit, the heatable chamber configured to receive heat from the fire pit,
a cooking surface disposed in the heatable chamber,
an enclosed top configured to retain the heat, the enclosed top and the cooking surface forming a cooking chamber, and
a leg spacing the oven from the fire pit.

33. The cooking system of claim 32, wherein the leg is shaped and configured to rest on an upward facing surface of the fire pit.

34. The cooking system of claim 32, wherein the burn chamber has a burn chamber width and the open bottom has an open bottom width at least as large as 80% of the burn chamber width.

35. A cooking system for cooking over a fire comprising:
a cooking surface configured to support food items;
a first heat deflector, comprising:
a side wall disposed at a side of the cooking surface;
a top wall above the cooking surface, the cooking surface and the top wall defining a cooking chamber, the top wall being angled with respect to the cooking surface such that the top wall includes an upper portion adjacent the side wall and a lower portion extending over the cooking surface; and
a first plurality of holes disposed at the lower portion of the top wall; and
an outer wall above the top wall, the outer wall including a second plurality of holes.

36. A cooking system for cooking over a fire comprising:
a cooking surface configured to support food items;
a first heat deflector, comprising:
a side wall disposed at a side of the cooking surface;
a top wall above the cooking surface, the cooking surface and the top wall defining a cooking chamber, the top wall being angled with respect to the cooking surface such that the top wall includes an upper portion adjacent the side wall and a lower portion extending over the cooking surface; and
a first plurality of holes disposed at the lower portion of the top wall; and
one or more legs configured to space the cooking surface above a heat source.

* * * * *